United States Patent
Makinen

(10) Patent No.: US 7,430,188 B1
(45) Date of Patent: Sep. 30, 2008

(54) DATA TRANSMISSION METHOD AND RADIO LINK SYSTEM

(75) Inventor: Jarmo Makinen, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/913,893

(22) PCT Filed: Mar. 6, 2000

(86) PCT No.: PCT/FI00/00174

§ 371 (c)(1), (2), (4) Date: Sep. 21, 2001

(87) PCT Pub. No.: WO00/54434

PCT Pub. Date: Sep. 14, 2000

(30) Foreign Application Priority Data

Mar. 5, 1909 (FI) .................................. 990483

(51) Int. Cl.
*H04B 1/56* (2006.01)
*H04L 5/14* (2006.01)

(52) U.S. Cl. ........................... 370/330; 370/478

(58) Field of Classification Search ......... 370/277–281, 370/294–296, 330
See application file for complete search history.

(56) References Cited

U.S. PATENT DOCUMENTS

| | | | |
|---|---|---|---|
| 5,566,168 A * | 10/1996 | Dent | 370/323 |
| 5,594,720 A * | 1/1997 | Papadopoulos et al. | 370/330 |
| 5,617,412 A | 4/1997 | Delprat et al. | 370/281 |
| 5,689,502 A * | 11/1997 | Scott | 370/281 |
| 5,867,487 A | 2/1999 | Normand et al. | 370/296 |
| 5,889,814 A * | 3/1999 | Simmons | 375/130 |
| 6,130,886 A * | 10/2000 | Ketseoglou et al. | 370/347 |
| 6,134,227 A * | 10/2000 | Magana | 370/330 |
| 6,269,086 B1 * | 7/2001 | Magana et al. | 370/280 |
| 6,351,458 B2 * | 2/2002 | Miya et al. | 370/330 |
| 6,587,444 B1 * | 7/2003 | Lenzo et al. | 370/330 |

FOREIGN PATENT DOCUMENTS

| | | |
|---|---|---|
| CA | 2219323 | 10/1996 |
| CA | 2311292 | 5/1999 |

(Continued)

OTHER PUBLICATIONS

An Office Action (dated Feb. 7, 2003 from the Australian Patent Office for Application No. 31686/00.

(Continued)

*Primary Examiner*—Firmim Backer
*Assistant Examiner*—Clemence Han
(74) *Attorney, Agent, or Firm*—Harrington & Smith, PC

(57) ABSTRACT

This invention relates to data transmission in a microwave link system particularly through point-to-multipoint connections. The arrangement according to the invention utilizes both frequency and time division duplex arrangement to simplify substation structures. In accordance with the invention a substation transmits at different times than it receives, and uses different frequencies for the transmission and reception. The central station, in turn, includes a duplexer unit, whereby it can both transmit and receive simultaneously when the transmission and reception frequencies are sufficiently apart. Such an arrangement achieves advantages of the time division duplex arrangement, such as e.g. an inexpensive substation structure, without the drawbacks related to the time division duplex arrangement.

13 Claims, 2 Drawing Sheets

FOREIGN PATENT DOCUMENTS

Figure 1:
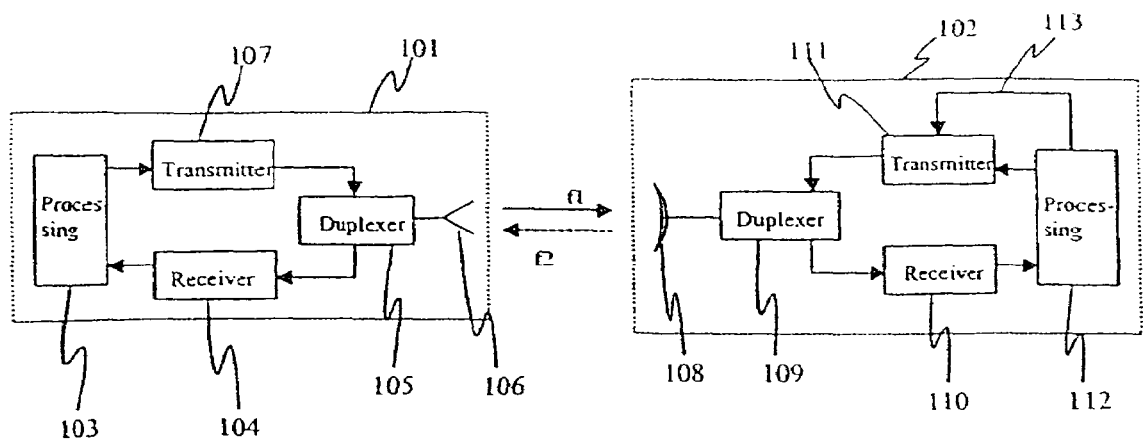

| | | |
|---|---|---|
| DE | 196 05 873 A1 | 8/1997 |
| DE | 196 10 334 A1 | 9/1997 |
| JP | 04373320 A | 12/1992 |
| WO | WO 97/21287 | 6/1997 |
| WO | WO 98/10566 | 3/1998 |
| WO | WO 98/33338 | 7/1998 |
| WO | WO 99/26437 | 5/1999 |

OTHER PUBLICATIONS

An Office Action (dated May 30, 2003) from the Patent Office of the People's Republic of China for Application No. 00804691.3.

Translation of Office Action dated Apr. 27, 2004 in corresponding Japanese Application.

Canadian Office Action dated Oct. 15, 2004 in Canadian patent application No. 2,362,766.

* cited by examiner

DATA TRANSMISSION METHOD AND RADIO LINK SYSTEM

This invention relates to data transmission in a microwave link system especially through point-to-multipoint connections.

In this context "point-to-multipoint" (PMP) refers to an arrangement where a central station is connected with a plurality of substations. Such an arrangement is used e.g. to connect base stations of mobile communication systems to a mobile communication network whereby several base stations serving mobile stations have a point-to-multipoint connection with a central station serving several base stations. In such an arrangement there is no need to arrange fixed signal wiring to every base station, which is a big advantage particularly in urban environment where there is a dense arrangement of base stations and where the installation of cables is laborious and expensive.

Point-to-multipoint systems usually employ a so-called frequency division duplex (FDD) arrangement, in which the uplink and downlink signals are transmitted at different frequencies so that the signals of different directions can be discriminated by frequency.

Point-to-multipoint systems use a time division duplex (TDD) system as well. In a time division duplex system the central station and substation share a common traffic channel used at different times by the central station and substation(s).

Arrangements in which a plurality of transmitting parties transmit signals on the same channel in such a manner that the signals are discriminated by the moment of transmission, are generally called time division multiple access (TDMA) arrangements. Arrangements typically used in point-to-multipoint connections are thus TDMA arrangements in uplink communications. So, the frequency division duplex arrangement described above may be called a FDD TDMA arrangement because in it the uplink and downlink signals are discriminated by frequency but the uplink signals are discriminated by time. Similarly, the time division duplex PMP arrangement described above may be called a TDD TDMA arrangement.

Other types of multiple access arrangements are known as well. In a frequency division multiple access (FDMA) arrangement, for instance, signals on the same signal path are discriminated by frequency. Applied to the one central station and a plurality of substations example described above a FDMA arrangement would mean that the substations transmit to the central station at their particular frequencies whereby the central station could discriminate the signals of the different substations by their transmission frequencies. In a code division multiple access (CDMA) arrangement the signals on the same signal path are discriminated on the basis of spreading codes.

FIG. 1 shows a prior-art frequency division duplex arrangement for discriminating between the uplink and downlink directions in point-to-multipoint connections. A central station 101 comprises a baseband processing unit 103. A transmitter 111 and receiver unit 104 take care of functions related to the transmission and reception of signals. A duplexer unit 105 couples both the transmitter unit 111 and the receiver unit 104 to an antenna so that they can transmit or receive signals through a single antenna 106. The coupling is such that at a particular frequency the duplexer unit 105 couples the transmitter unit 111 to the antenna 106 and at a second particular frequency the duplexer unit 105 couples the receiver unit 104 to the antenna 106. The duplexer unit is usually realized by means of filters. Correspondingly, a substation 102 is arranged so as to comprise the corresponding units for receiving and transmitting signals. The substation 102 includes an antenna 108, duplexer unit 109, transmitter unit 111, receiver unit 110 and a processing unit 112. In the arrangement according to FIG. 1 the central station 101 and substation 102 use two different frequencies f1; f2 to transmit signals. All substations 102 communicating with one and the same central station 101 use substantially the same transmission frequency to communicate with the central station 101. In addition, the substation 102 comprises an arrangement with which the processing unit 112 controls 113 the transmission of the transmitter unit 111.

Figure 2:
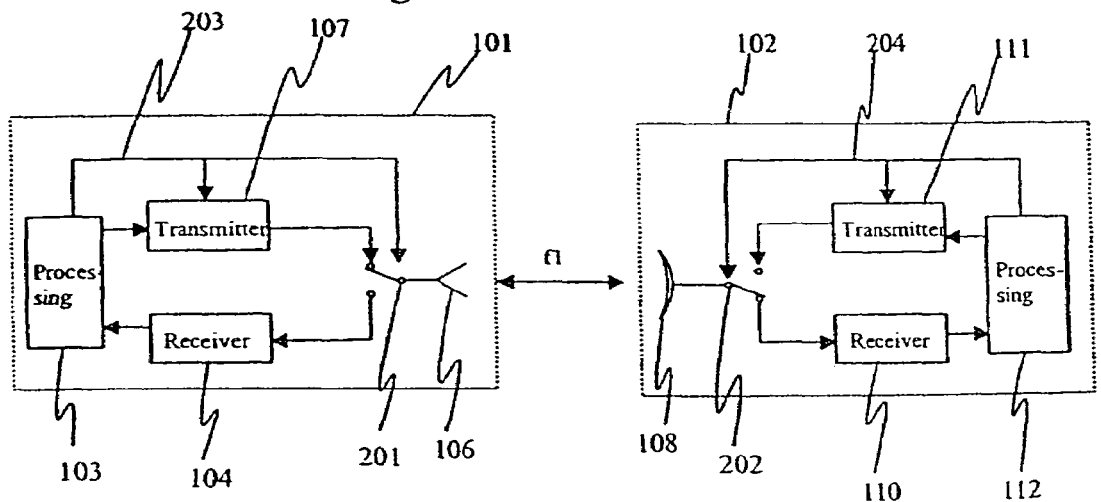

FIG. 2 shows a prior-art time division duplex arrangement for transmitting data in point-to-multipoint connections. A central station 101 comprises a processing unit 103, transmitter unit 107, receiver unit 104 and an antenna 106. Additionally in a time division duplex system there is between the antenna 106 and transmitter unit 107 as well as receiver unit 104 a switch element 201 to control the transmission and reception of signals. In the central station 101 the processing unit 103 is arranged so as to control 203 the operation of the transmitter unit 107 and the switch element 201. A prior-art substation 102 in a time division duplex system comprises an antenna 108, switch element 202, transmitter unit 111, receiver unit 110 and a processing unit 112. The processing unit 112 controls 204 the receiver unit 110 and switch element 202 in the substation 102 so that transmission occurs in the right time slot. When using the time division duplex arrangement, only one frequency is needed to convey the data since the transmission and reception are arranged so as to take place in different time slots.

Arrangements in accordance with FIGS. 1 and 2 are used at microwave frequencies such as 2 GHz and higher. Such prior-art arrangements are used at frequencies of up to several tens of GHz.

Both the frequency division duplex and the time division duplex system have drawbacks in point-to-multipoint systems implemented in the microwave region. The biggest disadvantage of the frequency division duplex system is that it requires filters, which are expensive components. In the microwave region, signal conductors, i.e. waveguides and filters, are relatively large mechanical structures that have to be machined at very small tolerances. The pass bands of filters must be made quite narrow so that the transition from the pass band to the stop band be steep enough. Moreover, the gap between the frequency bands of the uplink and downlink directions is typically quite narrow, which adds to the steepness required of the filter. Therefore, the pass band of a steep enough filter typically does not suffice to cover the whole frequency band used by the system. Thus, in order to cover the various sub-bands the radio apparatuses of radio link systems must be implemented in several different versions. So, versions are installed for the central and substations according to the operating frequency. Especially it may be required that several parallel transceiver units adapted to the different sub-bands be installed at the central stations in accordance with the operating frequencies used.

This kind of an arrangement is naturally very expensive. The continual expansion of broadband data transmission and mobile communication systems adds to the need for microwave links, too, whereby it is obvious that simpler and less expensive solutions are needed to realize point-to-multipoint connections. In this patent application microwave frequencies refer to 2 GHz and higher frequencies.

Use of expensive filters can be avoided by means of the time division duplex arrangement mentioned above. However, compared to the frequency division duplex arrangement the time division duplex arrangement has its own disadvantages. Compared to a solution based on separate transmission and reception frequencies a time division duplex system achieves only half of the transmission rate of the frequency division duplex system, as the time has to be divided between transmission and reception. This disadvantage can be alleviated by using higher data rates but this, in turn, makes the apparatuses more complex since the clock frequency of the data transmission elements must be increased. Furthermore, a time division duplex system is problematic in the rather usual case where the area managed by one central station is divided into separate sectors. In that case the central station will have one transceiver apparatus for each sector. This being the case, the transmission and reception periods of the different sectors have to be synchronized or the frequencies have to be chosen such that they are sufficiently apart so that a transmission of an adjacent sector will not disturb the reception of another sector at the central station. Because of the short distance between the transmitters and receivers of the different sectors at the central station the disturbance caused by a transmission in the non-synchronized case is very powerful unless the transmission and reception frequencies are significantly different. Moreover, time division duplex transmission is not allowed in all frequency ranges.

An object of this invention is to eliminate the prior-art problems described above. Another object of this invention is to provide a radio link system cheaper and simpler than prior-art solutions.

These objects are reached by arranging the central station so as to transmit a TDM signal, i.e. a multiplexed signal, at a first frequency and to receive signals from sub-stations at a second frequency, and by arranging each substation so as to operate on a time and frequency division basis, i.e. to receive during certain first periods at said first frequency and to transmit during certain second periods, which are separate from said first periods, at said second frequency.

A data transmission system according to the invention is characterized by what is specified in the characterizing part of the independent method claim. A radio link system according to the invention is characterized by what is specified in the characterizing part of the independent radio link system claim. Subclaims describe different advantageous embodiments of the invention.

An arrangement according to the invention uses both a frequency division duplex and time division duplex arrangement to simplify the substation structures. In accordance with the invention, a substation transmits at a different time than it receives, and uses different frequencies for the transmission and reception. The central station, in turn, includes a duplexer unit so it can both transmit and receive simultaneously when the transmission and reception frequencies are separate enough. Such an arrangement has the advantages of the time division duplex arrangement, such as e.g. inexpensive substation structure, without the disadvantages of the time division duplex arrangement.

Figure 3:
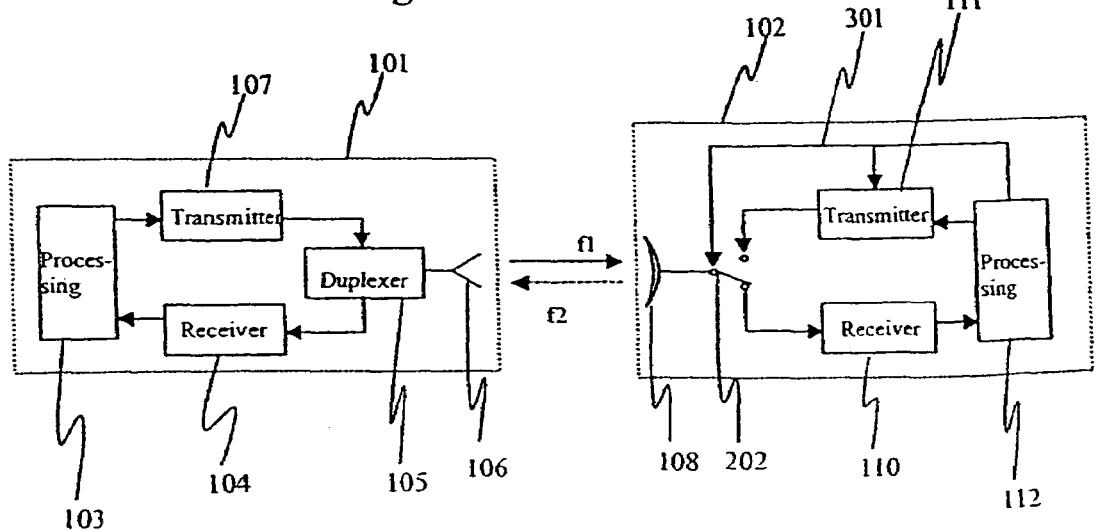
Figure 4:
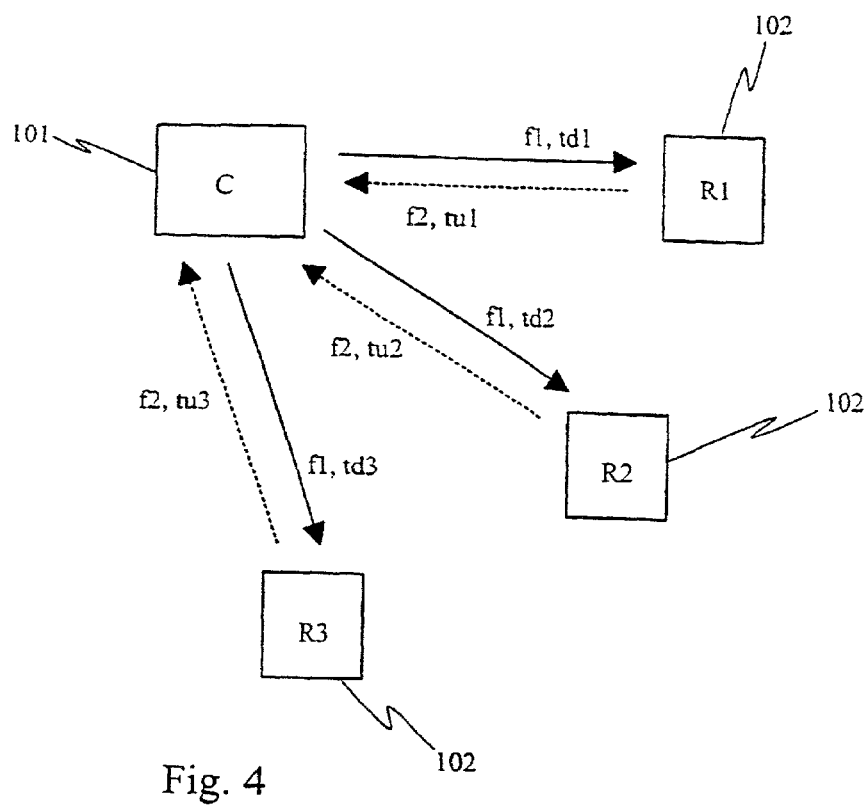
Figure 5:
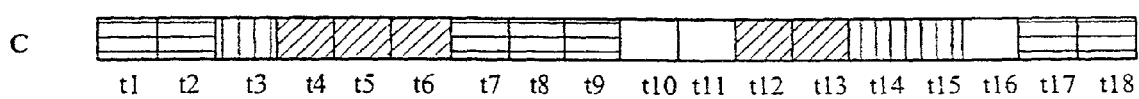
Figure 5:
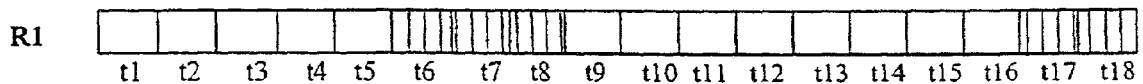
Figure 5:
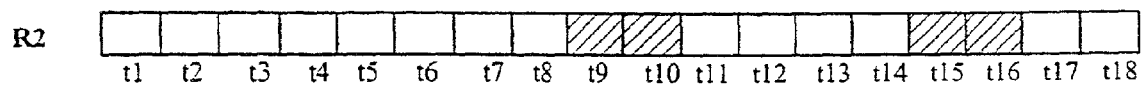
Figure 5:
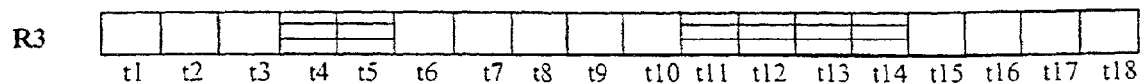

In the following, the invention is described referring to the attached drawings, where FIG. 1 shows a prior-art arrangement, FIG. 2 shows a second prior-art arrangement, FIG. 3 shows a solution according to the invention, FIG. 4 shows a network arrangement according to the invention, and FIG. 5 shows a time slot arrangement in a solution according to the invention.

FIGS. 1 and 2 were discussed above in connection with the description of the prior art. Like elements in the drawings are denoted by like reference designators.

FIG. 3 illustrates an advantageous embodiment of the invention. The Figure shows the structures of both the central station 101 and substation 102. In this explanatory solution according to the invention the central station 101 comprises a baseband processing unit 103 which produces, among other things, the baseband modulated signal for the transmitter unit 107 and processes the baseband signal produced by the receiver unit 104. The processing unit 103 controls the transmitter unit 107 which conveys the data to be transmitted via the duplexer unit 105 to the antenna 106. For reception the central station 101 comprises a receiver unit 104 coupled to the antenna 106 through the duplexer unit 105. The duplexer unit 105 comprises a filter to couple the antenna to the receiver unit 104 on the reception frequency band and a filter to couple the antenna to the transmitter unit on the transmission frequency band. In the arrangement according to the invention the central station 101 transmits at a first frequency f1 and receives at a second frequency f2, which first and second frequencies are different frequencies. The central station transmits a time division multiplexed (TDM) signal where the signals intended for the different substations are in different time slots. To cover the wide transmission and reception frequency bands the central station 101 may have several microwave parts adapted to parallel frequency bands, each part comprising at least an antenna 106, duplexer unit 105, transmitter 107 and a receiver 104. For clarity, FIG. 3 shows these elements only once.

The substation 102 comprises at least an antenna 108, switch element 202, trans-mitter unit 111, receiver unit 110 and a baseband processing unit 112. In the arrangement according to the invention the substations receive at a first frequency f1 and transmit at a second frequency f2. The switch element 202 couples the transmitter unit 111 to the antenna 108 for the duration of transmission and the receiver unit 110 to the antenna 108 for the duration of reception. The operation of the switch 202 is controlled by the baseband processing unit 112 or some other control unit in the substation. Furthermore, the baseband processing unit 112 produces, among other things, the baseband modulated signal for the transmitter unit 111 and processes the baseband signal produced by the receiver unit 110. The substation receives at frequency f1 at other times than its own transmission turn. In the arrangement according to the invention the substation thus employs dual-frequency time division duplex communications. The central station arranges the uplink and downlink traffic time slots for each substation in such a manner that no substation needs to transmit and receive simultaneously. So, the central station is adapted so as to select the time slots used by the substations.

In the various embodiments of the invention the equipment structures may be different than those shown in FIG. 3. For example, in an advantageous embodiment of the invention the central station does not have a duplexer unit but, instead, the central station has separate antennas for reception and transmission. In such a structure, the transmission and reception signals can be discriminated at least partly on the basis of the dimensions of the transmission and reception antennas. In such an embodiment the receiver branch advantageously includes a reception filter to filter the transmission signal and separate it from the signal to be received. The transmitter branch, too, may advantageously use filtering in order to limit the noise caused by the transmitter on the receiver's frequency band. Also in this embodiment the transmission and reception signals are discriminated at the central station on the basis of frequency.

Thus the different embodiments of the invention are united at least in that the central station comprises means for discriminating the reception signals from transmission signals on the basis of frequency. The discrimination based on frequency can be advantageously realized by means of filter elements. Furthermore, the discrimination based on frequency can be realized at least partly by means of transmitter and receiver antenna dimensions in embodiments where separate antennas are used for transmission and reception.

In the various embodiments of the invention the time division duplex arrangement in the substations may be realized in other ways than coupling the antenna through a switch element to the transmitter for transmission, and to the receiver for reception. For example, in an advantageous embodiment of the invention the transmitter and receiver in the substation have separate antennas. In such an embodiment the time division duplex arrangement can be realized by switching the transmitter off by some suitable means for the duration of reception.

Let us next consider the operation of an arrangement according to the invention in an example case illustrated by FIG. 4, where three substations 102, R1, R2, R3 communicate with the same central station C, 101. The central station transmits to the substations at frequency f1, and to the first substation R1 during the time period td1, to the second substation R2 during td2, and to the third substation R3 during the time period td3. The substations, in turn, transmit to the central station at frequency f2, and the first substation R1 transmits during the time period tu1, the second substation R2 during tu2, and the third substation R3 during the time period tu3. The reception time slot td1 of the first substation must be separate from the transmission time slot tu1 of the same substation, and the same applies to the other substations. Such an arrangement achieves a transmission capacity at the central station that equals that of a dual-frequency system according to the prior art, but this arrangement is considerably easier to implement, since no expensive duplexer units are needed in the substations 102.

FIG. 5 illustrates an example of the timing of the transmission and reception in the arrangement according to FIG. 4. FIG. 5 shows the transmission time slots of the central station C and substations R1, R2 and R3 during an exemplary time period. In FIG. 5 the squares t1 to t18 depict time slots. In the signal of the central station C the horizontally striped time slots are intended for substation R3, vertically striped time slots for substation R1, and the diagonally striped time slots are intended for substation R2. Empty squares indicate time slots during which the transmitter in question is not transmitting payload data. In the example of FIG. 5 the central station C transmits data addressed to substation R3 in time slots t1, t2, t7, t8, t9, t17 and t18, data addressed to substation R1 in time slots t3, t14 and t15, and data addressed to substation R2 in time slots t4, t5, t6, t12 and t13. Correspondingly at substations the striped squares denote time slots during which the substation in question transmits data to the central station. As can be seen from FIG. 5, each substation transmits at different times than it receives from the central station. Thus the substation radio part can be realized without an expensive duplexer unit.

FIG. 5 additionally shows that in an advantageous embodiment of the invention the time slots reserved for substations need not be repeated unchanged. The central station may control the substations on a per time slot basis, whereby uplink and downlink traffic capacity can be used different amounts for different substations according to the current communications needs. Uplink and downlink traffic capacity can in this way be reserved different amounts for a single substation as well, such as e.g. substation R2, to which the central station transmits in five time slots whereas R2 transmits to the central station in four time slots. Furthermore, the time slots may be divided between the different substations in a manner different than that described here, e.g. constant turns of a certain length for each substation.

In the example of FIG. 5 the downlink connection, i.e. the signal of the central station C, has some unused time slots, in this example time slots t10, t11 and t16. However, the arrangement according to the invention makes it possible to use all the time slots.

The central station may control the substations e.g. by including control commands in the data stream directed to the substations in some known manner.

The above-described arrangement according to the invention involves several advantages. One of the biggest advantages is that no different frequency versions are needed in the implementation of substations but the whole frequency band used can be covered by one single transmitter-receiver structure. Thus the system provider need not produce or store different frequency versions of substations. In addition, in point-to-multipoint connections there are several substations per one central station, so the savings brought by the arrangement according to the invention are significant. Moreover, the arrangement according to the invention gives a central station data transmission capacity as large as that given by the above-described frequency division duplex arrangement according to the prior art. Thus the arrangement utilizes the advantages of the time division duplex arrangement without decreasing the transmission capacity, which is a usual consequence of a solely time division based arrangement, and, on the other hand, achieves the central station data transmission capacity provided by the frequency division duplex system without doubling the data burst rate. The arrangement according to the invention achieves other advantages of the frequency division duplex arrangement as well, e.g. that at the central station the transmission from the transmitter unit of the central station does not disturb the reception at the receiver unit of the central station since the duplexer unit discriminates the transmission and reception signals by filtering. This way, the implementation of sectoring and allocation of frequencies is easier. The arrangement according to the invention finds particular application in the implementation of local multipoint distribution systems (LMDS). In addition, the arrangement according to the invention is applicable to systems according to the HiperAccess standard currently under development at the European Telecommunications Standards Institute (ETSI) and to other broadband radio access network (BRAN) systems as well as to other similar broadband transmission systems. In an advantageous embodiment of the invention the arrangement according to the invention is used to implement a broadband, over 10 Mbps transmission system.

An arrangement like the one described above may also be applied e.g. in a mobile communication network, whereby the central station 101 is advantageously a central station connected to a fixed transmission part of the mobile communication network, and the substation is advantageously located in connection with a base station of the mobile communication network, whereby communication between the base station and the rest of the mobile communication network takes place through the above-described radio link arrangement according to the invention. The radio link arrangement according to the invention can be utilized in conjunction with many different mobile communication systems, such as e.g. GSM (Global System for Mobile communications) or UMTS (Universal Mobile Telecommunication System). In such an embodiment the central station advantageously has a fixed connection or radio link connection with a base station controller (BSC).

The invention claimed is:

1. A data transmission method of a radio link system between a central station and at least one substation, comprising the steps of:
   transmitting a time division multiplex signal during a first plurality of time slots at a first frequency from the central station;
   receiving, at the central station that is configured to transmit and receive simultaneously, signals from said at least one substation during a second plurality of time slots at a second frequency, said second frequency being a different frequency than said first frequency and said signals of said at least one substation at said second frequency forming a time division multiple access signal; and
   reserving at least one time slot from said first plurality of time slots or said second plurality of time slots for said at least one substation needing more traffic capacity than at least one second substation, said first plurality of time slots being different than said second plurality of time slots and substantially all time slots being used.

2. The data transmission method of claim 1, wherein the central station controls the time slots used for transmission and reception by the substations.

3. The method of claim 1, wherein uplink and downlink time slots are allocated according to traffic needs.

4. A radio link system, comprising:
   a central station comprising means for discriminating reception signals from transmission signals on a basis of frequency; and
   at least one substation;
   wherein the central station is configured so as to simultaneously transmit a time division multiplex signal during a first plurality of time slots at a first frequency and receive a time division multiple access signal during a second plurality of time slots at a second frequency;
   wherein the at least one substation is configured so as to receive signals at said first frequency during the first plurality of time slots and said at least one substation is arranged to transmit signals at said second frequency during the second plurality of time slots, said second frequency being a different frequency than said first frequency and said signals transmitted by said at least one substation at said second frequency being arranged to form said time division multiple access signal; and
   wherein the central station is configured to reserve at least one time slot from said first plurality of time slots or said second plurality of time slots for said at least one substation needing more traffic capacity than at least one second substation, said first plurality of time slots being different than said second plurality of time slots and substantially all time slots being used.

5. The radio link system of claim 4, wherein the central station is configured to select said first and second plurality of time slots.

6. The radio link system of claim 4, wherein the system is located in a GSM mobile communication system.

7. The radio link system of claim 4, wherein the system is located in a UMTS mobile communication system.

8. The radio link system of claim 4, wherein the system is located in a broadband data transmission system.

9. The radio link system of claim 8, wherein the system is located in a LMDS system.

10. The radio link system of claim 8, wherein the system is located in a HiperAccess system.

11. The radio link system of claim 4, wherein uplink and downlink time slots are allocated according to traffic needs.

12. An apparatus for data transmission, comprising:
    a transmitter unit arranged to transmit a time division multiplex signal during a first plurality of time slots at a first frequency;
    a receiver unit arranged to receive signals from at least one substation during a second plurality of time slots at a second frequency, said second frequency being a different frequency than said first frequency and said signals of said at least one substation at said second frequency forming a time division multiple access signal; and
    a processing unit arranged to reserve at least one time slot from said first plurality of time slots or said second plurality of time slots for said at least one substation needing more traffic capacity than at least one second substation, said first plurality of time slots being different than said second plurality of time slots and substantially all time slots being used;
    wherein the apparatus is configured to transmit and receive simultaneously.

13. A data transmission method of a radio link system between a central station and at least one substation, comprising the steps of:
    transmitting a time division multiplex signal during a first plurality of time slots at a first frequency from the central station; and
    receiving, at the central station that is configured to transmit and receive simultaneously, signals from said at least one substation during a second plurality of time slots at a second frequency, said second frequency being a different frequency than said first frequency and said signals of said at least one substation at said second frequency forming a time division multiple access signal.

* * * * *